United States Patent [19]

Porsche

[11] Patent Number: 4,902,119
[45] Date of Patent: Feb. 20, 1990

[54] EYEGLASSES FRAME WITH ARTICULATED RESILIENT NOSE PIECE

[75] Inventor: Ferdinand A. Porsche, Gries, Austria

[73] Assignee: Optyl Eyewear Fashion International Corporation, Norwood, N.J.

[21] Appl. No.: 239,196

[22] Filed: Aug. 31, 1988

[30] Foreign Application Priority Data

Sep. 1, 1987 [DE] Fed. Rep. of Germany ....... 3729588

[51] Int. Cl.⁴ .................................................. G02C 5/12
[52] U.S. Cl. .................................... 351/137; 351/136; 351/139
[58] Field of Search ............... 351/136, 137, 138, 139, 351/131, 68, 69

[56] References Cited

U.S. PATENT DOCUMENTS 1,555,458  9/1925  Clulee ................................. 351/139
2,582,345  1/1952  Moeller ............................... 351/136

Primary Examiner—P. M. Dzierzynski
Attorney, Agent, or Firm—Fitch, Even, Tabin & Flannery

[57] ABSTRACT

An eyeglass frame includes ring-like lens mounting portions joined together by a bridge defining a medial cavity. A nose engaging piece has nose engaging pad portions joined together by an intermediate bight portion and also includes means for biasing the nose pad portions away from each other. A pair of opposed hinged arms are interconnected by interlocking hinge members disposed in the medial cavity of the bridge member and free ends of the arms are engaged with the nose engaging pad portions. Deflection of one nose pad portion results in a similar, complementary deflection of the other nose pad portion, thus providing a conformance to the shape of a wearer's nose which, in combination with the bias force of the saddle piece, provide a greatly improved wearing comfort.

17 Claims, 2 Drawing Sheets

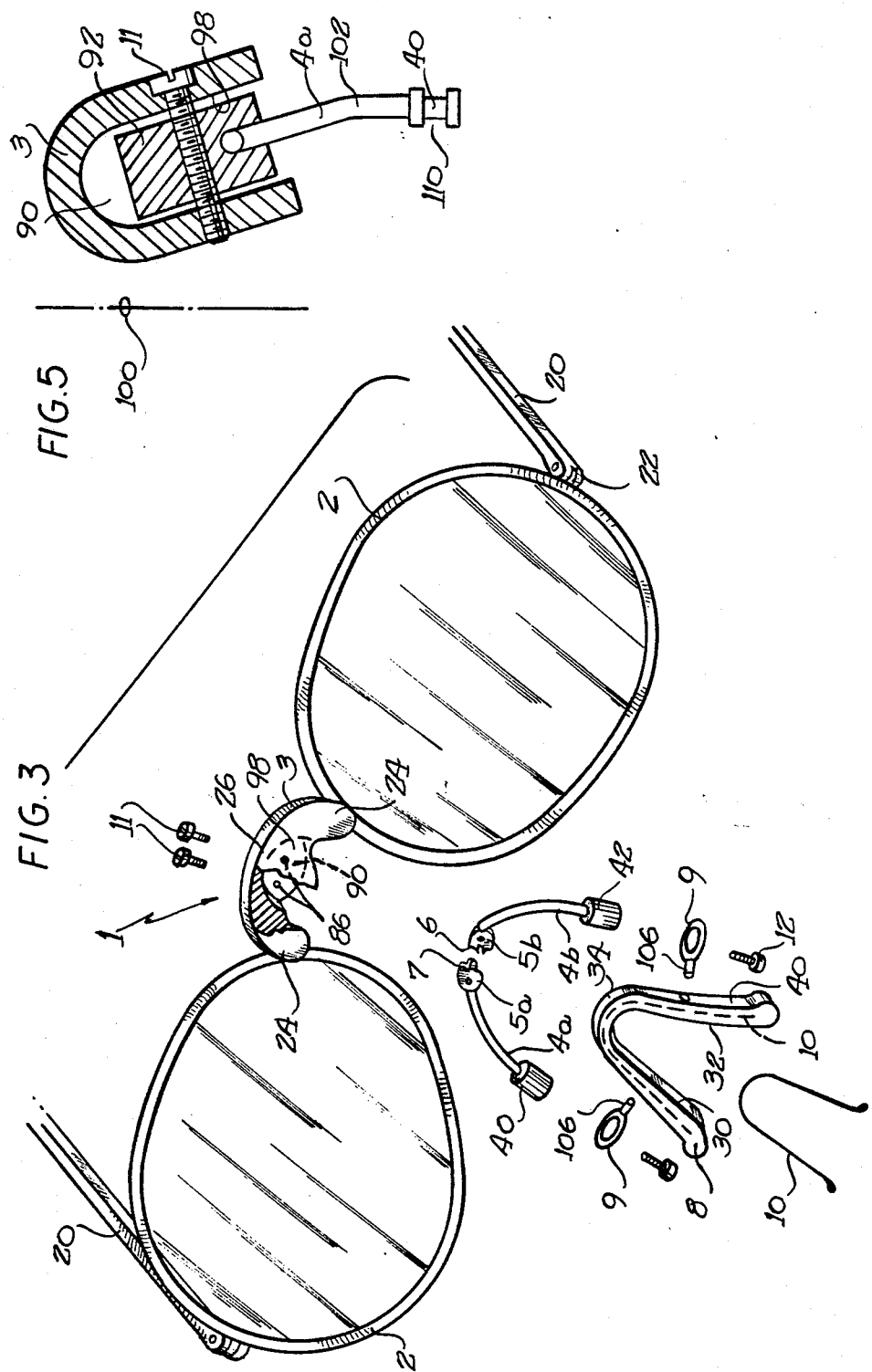

EYEGLASSES FRAME WITH ARTICULATED RESILIENT NOSE PIECE

BACKGROUND OF THE INVENTION

1. Field of the Invention

The present invention pertains to eyeglass frames and in particular to such frames having resilient nose pieces which engage the nose of a wearer.

2. Description of Related Art

Conventional eyeglass frames of various designs have been provided with features for improving the comfort of the wearer. Depending upon the optical prescription that may be required for the lenses of a pair of eyeglasses, the weight supported by the sides or bridge of the wearer's nose can be considerable. Further, the weight of the eyeglass frames themselves can add to the pressure to which the wearer's nose is subjected, particularly during prolonged wearing periods.

In an effort to reduce the pressure on the sides of the wearer's nose, nose rest pads have been mounted by spring steel wires or the like from the ring-like lens holder portions of an eyeglass frame. However, these pads are relatively small in size and accordingly the pressure on the wearer's nose is still significant. Further, if the resilient mounting of the nose rest pads is not carefully controlled, there is a chance that the pads will loosen when a wearer quickly turns his head, thereby causing a misalignment of the corrective lenses and a misadjustment of the eyeglass frames about the wearer's face.

In another attempt to alleviate a wearer's discomfort, nose pieces, such as those integrally molded with plastic eyeglass frames have been provided with an enlarged contact area where the nose pieces rest on the sides of a wearer's nose. However, there is a wide variety in the shape and size of wearers noses and the large inventory of eyeglass frames necessary to provide improved wearing comfort is prohibitively expensive. Further, such nose pieces lack the resilience and elasticity necessary to significantly improve a wearer's comfort.

Therefore, the need still exists for eyeglass frames having nose pieces that provide improved wearing comfort, and eyeglass frames having nose pieces which provide a reliable alignment for fitting of the corrective lenses despite movements of the wearer's head.

SUMMARY OF THE INVENTION

Accordingly, it is an object of the present invention to provide an eyeglass frame having resilient nose pieces which reduce the pressure borne by the sides of a wearer's nose.

Another object of the present invention is to provide eyeglasses having a nose piece of the above-described type which is resilient and which provides a relatively large area of surface contact with a wearer's nose.

A further object of the present invention is to provide an eyeglass frame having a nose piece with a pair of nose pad portions which are maintained in a symmetrical relationship to each other, to thereby maintain an alignment of the eyeglass frame about the wearer's face.

These and other objects according to the present invention which will become apparent from studying the appended description and drawings are provided in an eyeglass frame including ring-like lens mounting portions joined together by an improved nose piece construction, comprising:

a rigid bridge member extending between the lens mounting portions and defining a medial cavity;

a nose engaging saddle piece of flexible material including nose engaging pad portions joined together by an intermediate bight portion and including means for biasing the nose pad portions away from each other;

a pair of opposed hinge arms connected together by interlocking hinge means disposed in the medial cavity of the bridge member, each arm having a free end for engagement with the nose piece; and means for connecting free ends of the arms to spaced-apart portions on the saddle piece, adjacent the nose pad portions thereof.

In other aspects, the eyeglass frame according to the present invention provides a resilient nose piece construction which is articulated and spring-loaded, so that the weight of the eyeglasses tends to push the nose pad portions of the eyeglass frame apart to thereby reduce any pinching by the nose pieces on the bridge of the wearer's nose. The nose pad portions of the eyeglass frame are preferably made of a soft material which receives an internal spring wire and which need not be inherently resilient. According to one aspect of the present invention, soft nose pads are biased by spring members embedded within the material. The spring members, which tend to bias the nose pad portions apart from one another, are hingedly connected to each other by intermeshing hinge parts which interlock in a positive manner.

BRIEF DESCRIPTION OF THE DRAWINGS

In the drawings, wherein like elements are referenced alike:

FIG. 3 is an exploded perspective view of the eyeglass frame of the preceding figures, shown with the nose piece portion thereof partially broken away;

FIG. 5 is a cross-sectional view taken along line 5—5 of FIG. 1.

DETAILED DESCRIPTION OF THE PREFERRED EMBODIMENT

Figure 1:
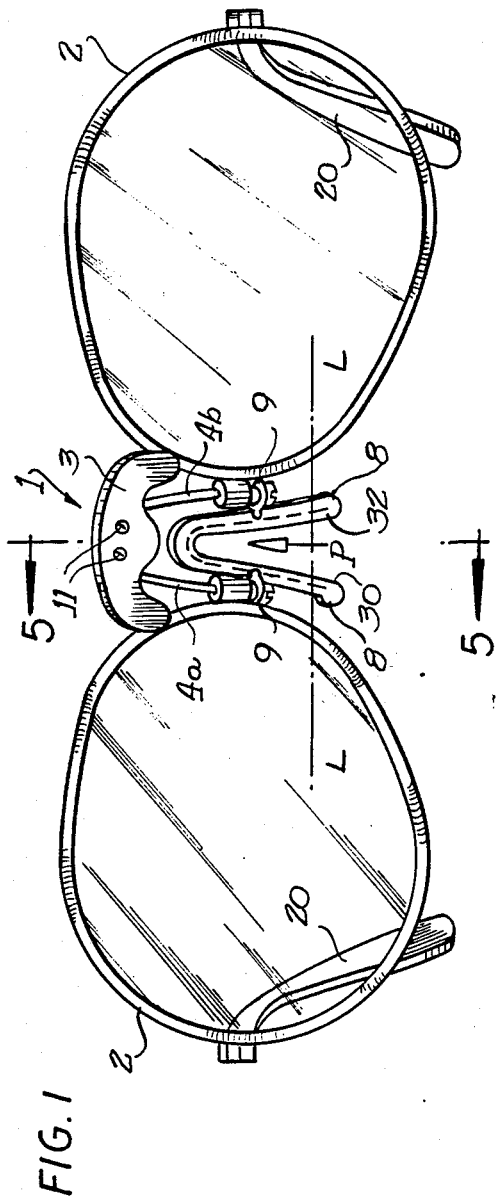
FIG. 1 is a front elevational view of an eyeglass frame illustrating principles according to the present invention.

Referring now to the drawings, and initially to FIGS. 1 and 3, an eyeglass frame assembly is generally indicated at 1. The frame assembly includes ring-like lens mounting portions 2 and temple pieces 20 of the type adapted to engage a wearer's temples and ears to hold the eyeglass frame securely about the head of a wearer. The temple pieces 20 are joined at their forward ends by hinge connections 22 to the laterally outer ends of lens mounting portions 2.

In the preferred embodiment, the lens mounting portions 2 are separately formed, and are joined together through an intermediate bridge member 3 having ends 24 joined to the lens mounting portions 2 and an intermediate hollow body portion 26. In the preferred embodiment, the lens mounting sections 2 are formed of plastic and bridge member 3 is made of metal. However, those skilled in the art will readily appreciate that the types of materials could be interchanged one for another, or other, different materials could be used. For example, it will become immediately apparent upon studying the following description that the central bridge member 3 could be integrally formed with the lens mounting portions 2 using an integral plastic molding process.

A generally U-shaped saddle piece 8 is formed of a soft material which may be, but need not be, resilient. Saddle piece 8 includes nose pad portions 30, 32 for engaging the sides of a wearer's nose, the nose pad portions joined together by an intermediate bight portion 34 which either engages the bridge of a wearer's nose or is spaced slightly thereabove, depending upon the configuration of the eyeglass frame assembly and the wearer's nose, as well as the wearer's head movements.

The saddle piece 8 may be made of resilient material which, when compressed, tends to separate the nose pad portions 30, 32 away from each other. If desired, the saddle piece material may be made of a soft, supple outer surface which preferably has a high coefficient of friction, thus preventing the eyeglasses from slipping out of their desired alignment relative to a wearer's face. The saddle piece 8 may advantageously be formed of one or more different types of plastic materials. For example, the inner, opposed surfaces of the saddle piece, those forming nose pads 30, 32, may be made of a supple material having a high coefficient of friction. The outer surfaces 40 of the saddle piece may comprise a harder, more resilient material. Alternatively, a harder more resilient plastic core may be embedded within the outer more supple exterior.

As yet another alternative, it is generally preferred that a generally U-shaped layer spring 10 be embedded within a soft plastic nose piece 8, providing a substantial bias force with a minimum mass, and thereby allowing the saddle piece 8 to be formed of relatively thin material, having a thickness generally half that illustrated in the Figures.

According to one aspect of the present invention, it is generally preferred that the bias force of spring 10 or the like biasing means associated with the saddle piece 8 be sufficiently weak as to allow the nose pad portions 30, 32 of the saddle to be readily spread apart under the weight of the lenses and lens frame, thereby minimizing any pinching effect on the bridge of a wearer's nose. According to another aspect of the present invention, saddle piece 8 is sufficiently pliable so as to readily conform to the contour of a wearer's nose under weight of the lenses and lens frame. The combined features of the supple saddle piece and its associated resilience which is readily overcome by the weight of the lenses and lens frame, contribute to provide heretofore unattainable comfort for a wearer.

Figure 4:
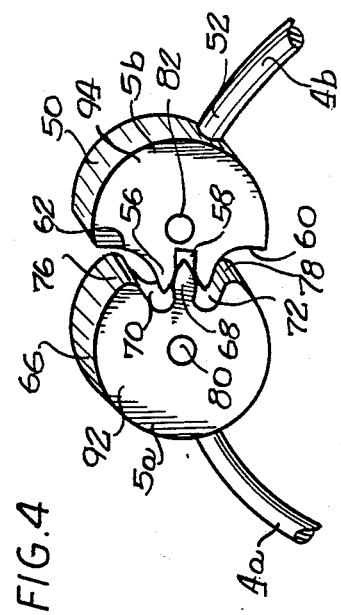
FIG. 4 is a fragmentary perspective view, taken on an enlarged scale, of the intermeshing hinge portions of the eyeglass frame illustrated in FIG. 3.
Figure 2:
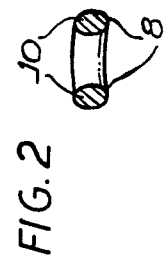
FIG. 2 is a fragmentary cross-sectional view taken along the line 2—2 of FIG. 1.

Referring again to FIGS. 1 and 3, a pair of arms 4a, 4b are provided, one for each nose pad portion 30, 32. The arms 4a, 4b have free ends 40, 42 and opposed interconnected ends 5a, 5b. Referring to FIG. 4, the ends 5a, 5b include intermeshing hinge parts which provide pivotal mounting for the arms 4a, 4b and an optional interengagement such that arms are adapted for simultaneous deflection upon a force imparted to one or both arms.

The end 5b has a generally semi-cylindrical body portion 50, joined to an end 52 of arm 4b. The end 5b further includes a channel portion 56 defining a recess or notch 58. Generally smooth, concave surfaces 60, 62 are provided on each side of channel portion 56.

The end 5a also includes a generally semi-cylindrical body 66 defining a generally tongue-like projection 68.

Concave recesses 70, 72 are provided on each end of projection 68 between the projection and a pair of rounded camming portions 76, 78. The camming portions 76, 78 are received in concave recesses 60, 62 of end 5b as the hinged ends are rotated relative to one another. Rotational mounting of the hinged ends is provided by internal apertures 80, 82 which receive screw-like fasteners 11 (see FIG. 3). The threaded ends of screw fasteners 11 are received in apertures 86 of bridge 3. The threaded fastener 11 pivotally mounts the hinge ends 5a, 5b in a recess or hollow pocket 90 of bridge 3. The opposed major surfaces 92, 94 of ends 5a, 5b contact a rear wall 98 of pocket 90 and slide thereagainst as the arms are moved toward and away from one another. As indicated in FIG. 5, screw fastener 11 has the head thereof adjacent the inner side of bridge 3, that side closest to the wearer's face. Also, as can be seen in FIG. 5, the bridge member 3, the pocket 90 formed therein and the body portions of the hinged ends 5a, 5b are, when fitted to a wearer whose head is in an upright position, inclined at an acute angle to a vertical line 100. The arm 4a, as with the other arm 4b, includes an offset 102 disposing the free end 40 thereof in a generally vertical position.

As mentioned above, the hinged ends 5a, 5b are independently pivotally mounted to bridge 3. Due to the interconnection of projection 68 and recess 58, rotation of one arm, and hence its hinged end, results in a cooperating, mirror image rotation of the other arm through the hinged intermeshing of the ends 5a, 5b. With reference to FIG. 4, clockwise displacement of arm 4a causes projection 68 to swing an arcuate path in a generally clockwise direction and, due to the hinged intermeshing, causes the hinged end 5b and hence the arm 4b connected thereto, to also rotate in a clockwise direction. Further, the hinged ends are configured and are interengaged such that a given displacement of one arm results in a similar corresponding displacement of the other arm, preferably with like amounts of deflection.

According to one aspect of the present invention, it is generally preferred that the movements of the arms 4a, 4b be interrelated for simultaneous or near simultaneous occurrence, and that the operation or deflection of one be a mirror image of the other at all points along their travel, and that this preferred operation be attained whether one or both arms have a deflection force applied thereto.

Referring again to FIGS. 1 and 3, the free ends 40, 42 of arms 4a, 4b are attached to saddle piece 8 through connectors 9 which preferably comprise eyelets having free ends 106 for securement to the saddle piece. The connectors 9 may, for example, comprise metallic eyelets with threaded ends, but in the preferred embodiment comprise plastic ring-like collars either separately formed or integrally molded with the saddle piece 8, the collars received in cylindrical recess portions 110 of free ends 40, 42 (see FIG. 5).

In operation, when the eyeglass frame according to the present invention is stored or is otherwise not in use, the nose pad portions of the saddle piece are drawn together under the force of spring 10 or the like biasing component for saddle piece 8 with a relatively close spacing, such that the nose pad portions will be separated from one another as the eyeglass frame is fitted to a wearer's face. According to one aspect of the present invention, the rest configuration of the saddle piece 8 is of a compressed or relatively closed nose-receiving opening formed between the nose pad portions, thus insuring that those portions will be spread apart when engaged with a wearer's nose. This insures that the nose pad portions will automatically adjust to the configuration of a wearer's nose, thus maximizing the surface contact with the sides of the wearer's nose and greatly improving the wearing comfort of the eyeglasses.

According to another aspect of the present invention, the spreading apart of nose pad portions is preferably accomplished under the weight of the glasses, namely, the lenses and the frames mounting those lenses. As a result, a heretofore unattainable secure seating of the eyeglasses about the face of the wearer is accomplished, with an attendant reduction in the pressure applied to a wearer's nose. It has been observed, with commercial embodiments of eyeglasses according to the present invention, that a person wearing the eyeglasses perceives them to be as light as a feather with a comfortable seating, even when the glasses are fitted with relatively thick and therefore heavy corrective lenses.

Thus, it can be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. An eyeglass frame including ring-like lens mounting portions joined together by a bridge member extending between the lens mounting portions, comprising:
   a nose engaging saddle piece of flexible material including nose engaging pad portions for engaging the sides of a wearer's nose, joined together by an intermediate bight portion and including means for biasing the nose pad portions away from each other;
   a pair of opposed hinge arms connected together by interlocking hinge means, each arm having a free end for engagement with the nose engaging saddle piece;
   the interlocking hinge means comprising first and second hinge members on respective ones of said hinge arms;
   the first hinge member including a tongue-like projection with concave recess portions on either side of said tongue-like projection and with rounded camming projections on either side of said concave recesses;
   the second hinge member including a pair of channel-defining finger portions receivable in respective ones of said concave recess portions and defining a channel therebetween for receiving said tongue-like projection, said second hinge member further including concave edges on either side of said finger portions;
   said tongue received in said channel and said fingers received in said concave recess portions when said free ends of said hinge arms are moved toward and away from each other;
   means for mounting the hinge means to the bridge member including a first pivot mounting member adjacent the tongue-like projection of the first hinge member and a second pivot mounting member adjacent the projection receiving channel of the second hinge member; and
   means for connecting free ends of the arms to spaced-apart portions on the saddle piece, adjacent the nose pad portions thereof.

2. The eyeglass frame according to claim 1 wherein the biasing means comprises a generally U-shaped spring member embedded within the saddle piece.

3. The eyeglass frame according to claim 2 wherein the connecting means comprises arm-engaging means between the free ends of the arm and said saddle piece.

4. The eyeglass frame according to claim 1 wherein the connecting means comprises eyelet members attached to the saddle piece and having means for receiving free ends of the arms.

5. The eyeglass frame according to claim 4 further comprising threaded fastener members to retain the free ends of the arms in engagement with the eyelets.

6. The eyeglass frame according to claim 1 wherein the connecting means comprise eyelet means integrally formed with the saddle piece, the eyelets including means for engaging the free ends of the arms.

7. The eyeglass frame according to claim 6 wherein the connecting means further comprises threaded fastener means for maintaining a secure engagement between the eyelet means and the free ends of the arms.

8. An eyeglass frame including ring-like lens mounting portions joined together by an improved nose piece construction, comprising:
   a bridge member extending between the lens mounting portions including end portions joined to the lens mounting portions and a medial portion defining a chamber;
   a nose engaging saddle piece of flexible material including nose engaging pad portions joined together by an intermediate bight portion and including means for biasing the nose pad portions away from each other;
   a pair of opposed hinge arms connected together by interlocking hinge means disposed in the chamber of the bridge member, each arm having a free end for engagement with the nose piece; and
   means for connecting free ends of the arms to spaced-apart portions on the saddle piece, adjacent the nose pad portions thereof.

9. The eyeglass frame according to claim 8 wherein the bridge member defines an opening at the bottom portion thereof through which the arms extend in a direction generally inclined toward the wearer's face.

10. The eyeglass frame according to claim 9 wherein the connecting means comprises arm-engaging means between the free ends of the arm and said saddle piece.

11. The eyeglass frame according to claim 8 wherein the biasing means comprises a generally U-shaped spring member embedded within the saddle piece.

12. The eyeglass frame according to claim 8 wherein the connecting means comprises eyelet members of the arms and having means for mounting to the saddle piece.

13. The eyeglass frame according to claim 12 further comprising threaded fastener members to retain the free ends of the arms in engagement with the eyelets.

14. The eyeglass frame according to claim 8 wherein the connecting means comprise eyelet means integrally formed with the saddle piece, the eyelets including means for engaging the free ends of the arms.

15. The eyeglass frame according to claim 14 wherein the connecting means further comprises threaded fastener means for maintaining a secure engagement between the eyelet means and the free ends of the arms.

16. The eyeglass frame according to claim 8 wherein the interlocking hinge means comprises a hinge member on one arm including a projection and a hinge member on the other arm including a projection-receiving recess.

17. The eyeglass frame according to claim 16 wherein the one hinge member defines concave portions on either side of said projection and the other hinge member includes a pair of finger-like portions receivable in said concave portions and defining said projection-receiving recess therebetween.

* * * * *